(12) United States Patent  (10) Patent No.: US 7,114,902 B2
Reiter  (45) Date of Patent: Oct. 3, 2006

(54) SELF-TAPPING BUSH-SHAPED SCREWED INSERT

(75) Inventor: Stefan Reiter, Nendeln (LI)

(73) Assignee: Pama Reiter Stefan, Nendeln (LI)

( * ) Notice: Subject to any disclaimer, the term of this patent is extended or adjusted under 35 U.S.C. 154(b) by 15 days.

(21) Appl. No.: 10/299,061

(22) Filed: Nov. 19, 2002

(65) Prior Publication Data

US 2004/0096291 A1    May 20, 2004

Related U.S. Application Data

(63) Continuation of application No. PCT/CH01/00100, filed on Feb. 14, 2001.

(30) Foreign Application Priority Data

May 19, 2000   (SZ)  ............................. 2000 1009/00

(51) Int. Cl.
*F16B 35/04*    (2006.01)
(52) U.S. Cl. ...................... 411/412; 411/387.4; 411/413
(58) Field of Classification Search ................ 411/178, 411/386, 387.4, 403, 411–413
See application file for complete search history.

(56) References Cited

U.S. PATENT DOCUMENTS

| | | | | |
|---|---|---|---|---|
| 3,911,781 A | * | 10/1975 | Bappert | ........................ 411/418 |
| 4,892,429 A | | 1/1990 | Giannuzzi | |
| 5,116,337 A | * | 5/1992 | Johnson | ........................ 606/73 |
| 5,885,041 A | * | 3/1999 | Giannuzzi et al. | ............ 411/82 |
| 5,957,646 A | * | 9/1999 | Giannuzzi et al. | .......... 411/412 |
| 6,302,632 B1 | * | 10/2001 | Lin | ............................. 411/404 |
| 6,322,307 B1 | * | 11/2001 | Glover | ........................ 411/412 |
| 6,406,376 B1 | * | 6/2002 | Lin | ............................. 470/63 |

FOREIGN PATENT DOCUMENTS

| | | |
|---|---|---|
| DE | 295 02 052.0 | 5/1995 |
| DE | 298 12 947 U1 | 1/2000 |
| FR | 2642801 A  * | 8/1990 |

OTHER PUBLICATIONS

White, Graham. British Fastening Systems. http://www.enginehistory.org/british_fasteners.htm.*

* cited by examiner

*Primary Examiner*—William L. Miller
(74) *Attorney, Agent, or Firm*—Buchanan Ingersoll & Rooney PC

(57) ABSTRACT

A thread-cutting screwed dowel has an essentially cylindrical, sleevelike dowel body with an axial bore and with a load engagement device disposed in the interior of the dowel body, for example with a female thread. On its outer face, the dowel body is equipped with at least one cutting edge, which extends helically along a majority of the outer face of the dowel body and protrudes radially past it. The helical cutting edge is embodied as a primary cutting edge and wraps around the dowel body over its length in at least three windings. Besides the load engagement device, an additional engagement is provided for transmitting a torque in the interior of the dowel body.

22 Claims, 1 Drawing Sheet

SELF-TAPPING BUSH-SHAPED SCREWED INSERT

RELATED APPLICATIONS

This application claims priority under 35 U.S.C. §119 to Swiss Application 2000 1009/00 filed in Switzerland on May 19, 2000, and as a continuation application under 35 U.S.C. §120 to PCT/CH01/00100 filed as an International Application on Feb. 14, 2001, designating the U.S. the entire contents of which are hereby incorporated by reference.

BACKGROUND

1. Field of the Invention

The invention relates to a thread-cutting, sleevelike screwed dowel.

2. Background Information

For fastening components to substrates, such as concrete, stone, brick masonry and the like, dowels are typically used. They have a sleevelike dowel body, which is anchored in a prepared bore in the substrate, and load engagement means, which for securing the component cooperate with the actual fastening means, such as a screw, bolt or the like. The load engagement means are typically female threads, which are provided in the inner wall of the sleevelike dowel body that is provided with a bore. However, other types of load engagement means can also be provided, such as bayonet mounts or similar positive-engagement connections. Another type of common load engagement means is insertable quick acting closures and the like. Anchoring the dowels in the substrate is typically done by radially spreading open a spreading region on the front end portion, in terms of the setting direction, of the dowel body. To that end, a typically conical expander body is displaced in the bore of the sleevelike dowel body, spreading the spreading regions radially apart. The expander body can be disposed inside the bore and driven forward into the bore. In so-called outer-cone dowels, the expander body is firmly clamped to the front end of the dowel body. For anchoring the dowel in the substrate, the usually metal sleevelike dowel body is driven over the metal expander body, the latter being braced on the bottom of the drilled hole. The spreading region is radially widened in the process.

The relative displacement between the sleevelike dowel body and the conical expander body is accomplished by means of axial chamfers, with which the cone is driven forward in the bore, or the dowel body is driven onto the expander body. Because the setting is done by hammering, the described expansion dowels are not suitable for every substrate. In brick masonry, for instance, the force of the axial blows damages the brick. After that, secure anchoring is longer possible. In other substrates as well, such as porous sandstone, the axial blows can cause damage to the expander body or to the sleevelike dowel body, with the result that the required load-bearing values are not attained. The non-positive anchoring of this type of dowel in the substrate by radial spreading apart of the spreading region of the dowel body is a disadvantage in many applications. Because of the relatively high spreading forces, minimum edge spacings and minimum axial spacings must be adhered to, if the security of the fastening point is to be assured. This often undesirably limits the possibilities for fastening components.

Since it is often absolutely necessary to provide fastening points at slight axial and peripheral spacings, in a second type of dowels a positive-engagement anchoring that is largely free of spreading pressure is provided. In so-called undercut dowels, "positive-engagement anchoring" means that expansion tabs provided on the dowel body are deployed in an undercut that is typically made in the vicinity of the base of the drilled hole. The undercut has to be made beforehand separately, with the aid of special undercutting devices in the drilled hole. This type of fastening technology is very time-consuming and expensive. It is therefore typically employed only for fastenings that are especially relevant to safety and especially for fastenings that must carry extremely heavy loads.

From the prior art, a dowel anchored by positive engagement is also known that makes do without the separate making of an undercut in the bore in the substrate. This dowel has a cylindrical dowel body, which is provided with an axial through bore. A female thread serves as the load engagement means. Cutting edges are disposed on the outer wall of the dowel body, winding helically around the dowel body in the manner of a steep thread. The steepness of the helically extending cutting edges is selected such that a cutting edge, over its entire length, wraps around less than 720° of the dowel body. In other words, the steep-threaded cutting edge, along its entire length, winds around the outer face of the dowel body in less than two windings. The cross section of the cutting edges is essentially triangular. A leading cutting edge in the setting direction forms a larger angle with a vertical to the dowel axis than the trailing cutting edge does. The steep leading edge, together with the great steepness of the steep-threaded cutting edges, is intended to assure that the dowel on being hammered into the drilled hole by axial blows will automatically dig into the wall of the hole and by cutting establish a positive engagement. The shallower trailing cutting edge is intended, by self-locking in the bore, to secure the dowel that is anchored by positive engagement. The setting operation for this known self-cutting dowel requires relatively strong axial blows. This limits the range of use of this dowel. For brick masonry or for less firm substrates, the dowel cannot be used, because the substrate can be damaged by the axial blows in the setting operation. The result would be that the required load-bearing values are unattainable. Securing the anchored dowel by self-locking in the cutting thread region makes it difficult to remove, should that become necessary. In particular, there is the risk that the wall of the bore will become damaged.

SUMMARY OF THE INVENTION

It is therefore the object of the present invention to overcome these disadvantages of the dowels of the prior art. A dowel is to be created which makes fastenings possible with small axial and peripheral spacings. The dowel should also make fastenings with satisfactory load-bearing values possible even in what until now had been critical substrates, such as brick masonry, porous sandstone, and the like. Fastenings in the tension zone should also be made possible. Damage to the substrate should be avoided. Setting the dowel should be simple to do and should not require any specially embodied setting tool. It should also be possible to remove the dowel again, as needed, in a simple way.

An exemplary thread-cutting screwed dowel of the invention has an essentially cylindrical, sleevelike dowel body with an axial bore and with load engagement means disposed in the interior of the dowel body. On its outer face, the dowel body is equipped with at least one primary cutting edge, which extends helically along a majority of the outer face of the dowel body and protrudes radially past it. The primary cutting edge wraps around the dowel body over its length in at least three windings. Besides the load engagement means, engagement means for transmitting a torque are provided in the interior of the dowel body.

In a distinction from the dowels known from the prior art, in a screwed dowel according to exemplary embodiments of the invention, the at least primary cutting edge on the outer face of the dowel body is embodied not as a steep thread but instead wraps over its total length around the dowel body in at least three windings. Because of this embodiment of the primary cutting edge, the screwed dowel is fundamentally different from the known dowels, which can be set by axial blows. The lesser pitch of the helically extending cutting edge or edges promotes a setting operation by means of a torque transmission to the dowel body. Unlike the known self-cutting dowels, a screwed dowel according to exemplary embodiments of the invention can therefore be screwed into the prepared bore without axial blows. To that end, engagement means are provided in the interior of the dowel body, which make it possible to transmit a torque to the dowel body. The engagement means are provided in addition to the load engagement means, so that the torque transmission cannot cause any damage to the load engagement means. The setting operation is performed solely by means of transmitting a torque to the dowel body. Because the screwing setting operation is done purely rotationally, the bore wall in the substrate can be machined much more gently. Damage to the substrate is avoided. Dispensing with axial blows makes it possible for the screwed dowel to be screwed even into more-problematic substrates, such as brick masonry or porous sandstone and the like. The lesser steepness of the helically extending primary cutting edge and the greater number of windings leads to an improved positive engagement, because the greater number of radial projections contributes to holding the dowel. The greater number of windings that cut into the bore wall makes it possible for the screwed dowel of the invention to be used even in the tension zone of the substrate, especially in concrete. The setting operation of the screwed dowel is self-explanatory and easily accomplished. The screwed dowel can also be removed again simply and gently when needed, by reversing the exertion of torque.

The engagement means for torque transmission to the dowel body can be provided in the front portion of the dowel. However, as much as possible to eliminate the risk of damage to the load engagement means, the engagement means are provided in the rearward end region of the dowel body. This makes it possible to take precautions that act to counter unintended damage to the axially adjoining load engagement means in the interior of the dowel body.

For the engagement means for torque transmission, various variants are possible. For instance, the inner wall of the dowel body can be provided in the rearward end region with axially extending grooves, which are diametrically opposite one another and open out at the rearward end of the dowel body. A correspondingly embodied rodlike tool with two radially projecting pins can be introduced into these grooves. In a preferred variant embodiment of the invention, the engagement means in the rearward end region of the dowel body are embodied as an insertion portion with an essentially polygonal cross section. The number and size of torque transmission faces determines the local loads on the dowel body in the torque transmission. An essentially quadrilateral, preferably essentially square cross section of the insertion portion proves especially expedient. This assures large enough torque transmission faces and enough remaining material of the dowel body so that upon stress, material failures will not occur in the rearward end region of the dowel body.

For manual setting, given suitable dimensioning of the insertion portion, the screwed dowel can be simply inserted on the square body of the ratchet lever of a socket wrench device. The screwed dowel then takes the place of a socket nut. The setting operation is then largely equivalent to manipulating the ratchet lever in a screwing operation. It is understood that the screwed dowel can also be set with the aid of a screwdriver or rotary drill. To that end, a shaft length corresponding to the insertion portion is fastened in the tool receptacle, and the screwed dowel is "screwed into" the bore by actuating the tool It is understood that in the case where rotary drills supported by axial impact are used, the impact mechanism is turned off. To further facilitate setting the screwed dowel by machine, screwdrivers can even be used that have impact support in the screwing-in direction. Such tools are also known by the term "tangential-impact screwdrivers".

Because the dowel body has a rearward end region whose outside diameter widens toward the rear end, the screwed dowel of the invention can be braced in the prepared bore. This acts as an additional means of securing the set screwed dowel against reverse rotation. The greatest outside diameter in the rearward end region does not exceed a maximum outside diameter measured over the cutting edge windings. Besides the easier settability of the screwed dowel, this outside diameter limitation also has advantages for production. A screwed dowel embodied in this way is also suitable for through-insertion mounting and can in particular be anchored in the substrate flush with the surface. In a modified variant of the invention, a screwed dowel can have an encompassing annular collar or a spacer collar on its rear end. This allows setting the dowel with a defined projection past the substrate.

To simplify the setting operation for the screwed dowel of the invention, two auxiliary cutting edges are provided on the outer wall of the dowel body, in addition to the primary cutting edge, and they extend helically over at least 1.5 windings. Thus on at least a portion of its outer surface, the dowel sleeve has three cutting edge windings extending side by side. The primary cutting edge and the auxiliary cutting edges each have one thread onset region, on a front region of the dowel body in terms of the setting direction. At the thread onset regions, the radial projection of the primary cutting edge and of the two auxiliary cutting edges relative to the outer face of the dowel body drops to essentially zero. The thread onset regions are spaced apart from one another by an angular spacing of approximately 120° on the same circumferential circle of the dowel body. The disposition of the primary and auxiliary cutting edges and the geometric design of the thread onset regions improve the centering of the screwed dowel in the drill hole. As a result, the primary cutting edge can engage the substrate, so that as the screwed dowel is being set by rotary means, it will cut a thread into the bore wall automatically. The auxiliary cutting edges can be provided along the entire length of the dowel body. However, for their centering function, it suffices if they extend over at least 1.5 windings. As a result, they can extend in the outer face of the dowel body. To make it possible to keep the torques required for the setting operation slight, it proves advantageous if the two auxiliary cutting edges have a lesser maximum radial projection past the outer wall of the dowel body than the primary cutting edge does. The pitches of the primary cutting edge and auxiliary cutting edges can be embodied as equal. In a variant of the invention, in which the auxiliary cutting edges additionally perform retention and bracing functions, the pitches of the two helical auxiliary cutting edges can also differ from the pitch of the primary cutting edge. This provision can have an advantageous effect for instance on the reverse torque required to loosen the screwed dowel.

The primary cutting edge has one leading edge and one trailing edge in the setting direction. For the cutting operation on the one hand, and for the forces occurring upon tensile loading of the screwed dowel, an angle of greater than 8° and preferably greater than 10° between the leading and trailing edges of the primary cutting edge that protrudes the farthest radially past the surface that proves advantageous. For the cutting operation, larger angles are advantageous. On the other hand, to prevent spreading forces upon tensile loading of the screwed dowel, the smallest possible angles are a goal. The lower limit indicated for the angle proves to be a satisfactory compromise, which guarantees controllable torques on the one hand and low spreading forces on the other.

To further facilitate setting the screwed dowel, on the front end of the dowel body, an introduction portion can be provided, which has a smaller outside diameter than the dowel body in the region of the helical cutting edge or edges. This smaller-diameter region makes it easier to place the screwed dowel against the orifice of the drilled hole, so that the cutting operation can be begun. In an advantageous variant of the invention, the introduction portion is embodied as tapering conically toward the free front end. When the screwed dowel is placed against the drilled hole, this still further improves its centering.

The bore in the dowel body can be a through bore, for instance. This offers the capability of embodying a female thread, for instance, as a load engagement means as far as the front end of he dowel. In an alternative variant embodiment of the invention, the bore is embodied as a blind bore. This has the advantage that the material removed from the wall of the hole by the cutting edges cannot get into the region of the load engagement means.

As already noted at the outset, the load engagement means can be embodied in various ways. However, female threads, such as metric threads or Whitworth threads, have proved especially useful. The pitch of the female thread is less than that of the pitch of the primary cutting edge on the outer wall of the dowel body. The female thread and the threadlike cutting edge or edges have the same direction of rotation. This has the advantage that when a threaded screw is being screwed into a screwed dowel that may possibly not yet be completely fixed, the screwing-in operation contributes to the final fixation. The lesser pitch of the female thread results in lesser reverse torques required to loosen the threaded screw. These are less than the requisite reverse torque for loosening the screwed dowel anchored in the substrate. In this way, unintentional loosening of the screwed dowel is counteracted.

While the screwed dowel according to exemplary embodiments of the invention can in principle, for fastenings in very soft materials, be made from plastic, it proves intrinsically advantageous for use of the screwed dowel in hard substrates, in particular, if the dowel body and the cutting edges are of metal, such as a stainless steel. As a result, the screwed dowel is corrosion-resistant and in particular is also fireproof. For technical production reasons but also for reasons of strength, the primary cutting edge and optionally the auxiliary cutting edges are advantageously embodied integrally with the dowel body. Then the auxiliary cutting edges can be already rolled into the dowel body blank, while the primary cutting edge is not made until a subsequent shaping process.

BRIEF DESCRIPTION OF THE PREFERRED EMBODIMENTS

The invention is described in further detail below in terms of an exemplary embodiment shown in the drawing. Shown schematically and not to scale are:

DETAILED DESCRIPTION OF THE PREFERRED EMBODIMENTS

Figure 1:
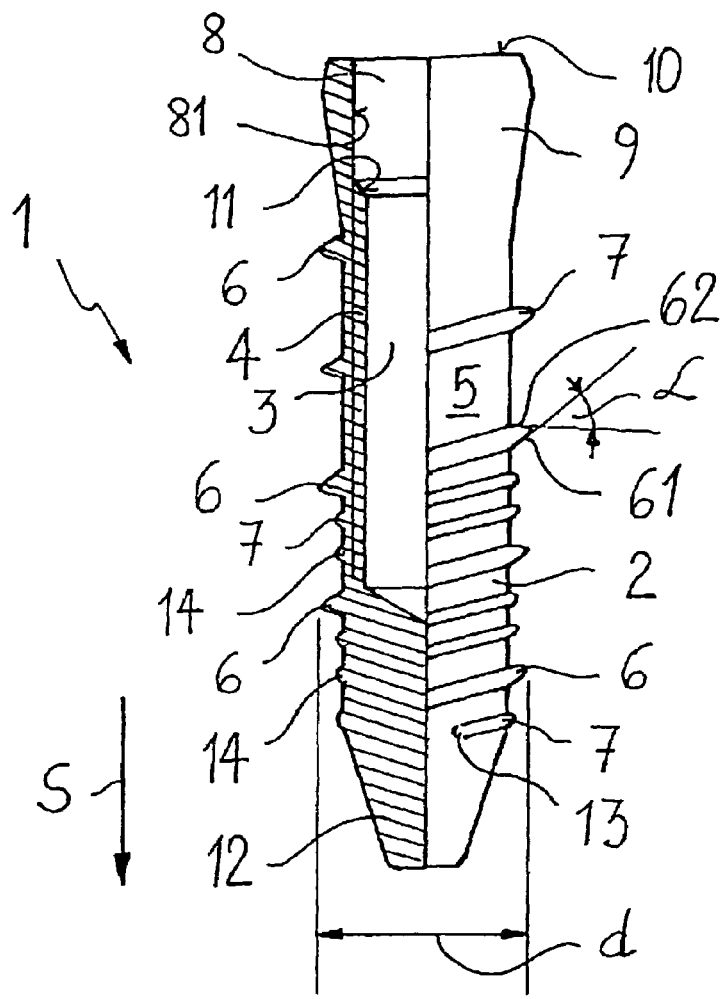
FIG. 1 is a screwed dowel according to an exemplary embodiment of the invention, with one half lengthwise being shown in section.
Figure 2:
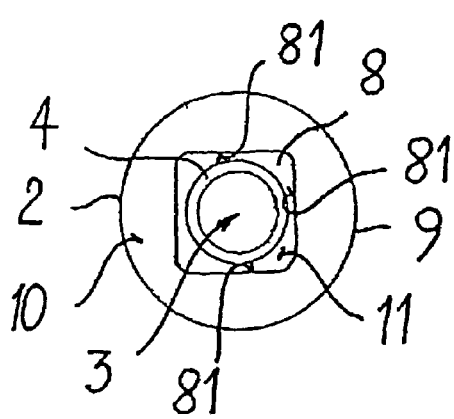
FIG. 2 is a plan view on the rear face end of the screwed dowel.
Figure 3:
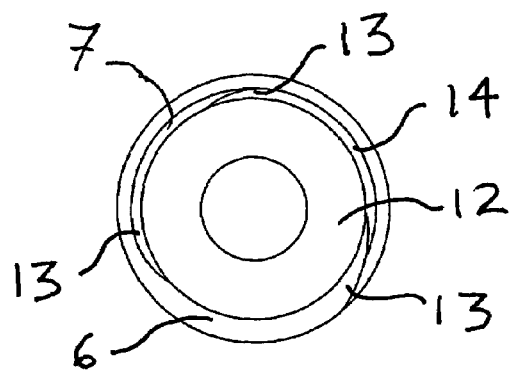
FIG. 3 is a plan view on the front face end of the screwed dowel.

An exemplary embodiment of a screwed dowel of the invention, shown schematically in FIGS. 1 to 3, is identified overall by reference numeral 1. The screwed dowel 1 has a sleevelike, essentially cylindrical dowel body 2 with a blind bore 3. A female thread 4 is embodied in the blind bore 3 and serves as a load engagement means, for instance for a screw bolt. The dowel body 2 has a rearward end region 9, with an engagement means embodied as an insertion portion 8. The insertion portion 8 has torque transmission faces 81 for transmitting torque. In the exemplary embodiment shown, the insertion portion 8 is embodied with an essentially square cross section, with four equal torque transmission faces 81. The inside width of the insertion portion 8 is greater than the diameter of the bore 3 having the female thread 4. The result, at the transition from the insertion portion 8 to the female thread 4, is a stop 11 extending all the way around, for instance in the form of a conical ring. This stop, when the screwed dowel is coupled to a coupling piece embodied correspondingly to the insertion portion, prevents damage to the beginning of the female thread 4. The coupling piece can for instance be a square on the ratchet of a socket wrench tool, or a square shaft that can be fastened into the tool receptacle of a screwdriver or rotary drill.

One primary cutting edge 6 and two auxiliary cutting edges 7, 14 extend helically on the outer face 5 of the dowel body. The helically extending primary cutting edge 6 extends from the rearward end region to an introduction portion 12 on the front end, in the setting direction S, of the dowel body 2. The primary cutting edge 6 wraps around the dowel body in at least three windings. In the case shown, there are four windings, for example, resulting in a total wrap angle of 4×360°=1440°. The auxiliary cutting edges 7, 14 extend over at least 1.5 windings. They may be guided as far as the rear end or, as shown, they can come to an end after the minimum number of windings in the outer face 5 of the dowel body 2. The auxiliary cutting edges have a smaller maximum radial projection past the outer face 5 of the dowel body 2 than the primary cutting edge does. The difference in the maximum radial projection of the three helically extending cutting edges is approximately 0.5 mm to approximately 2.5 mm, for instance. The principle of this type of high-low multiple cutting edges is known from the prior art and is used for instance in so-called concrete screws as well, which are driven directly into predrilled holes in the concrete. The helically extending cutting edge 6 with the greater radial projection has one leading cutting edge 61 and one trailing cutting edge 62, in the setting direction. The two cutting edges 61, 62 form an angle with one another that is greater than 8°, and preferably greater than 10°. The angle of the cutting edges 61, 62 is less than 105° and preferably less than 90°. The greatest radial projection of the helically extending cutting edge 6 is for instance from approximately 1.5 mm to approximately 4 mm. The primary cutting edge 6 and the auxiliary cutting edges 7, 14, on a front portion, relative to the setting direction S, of the dowel body 2, each have respective thread onset regions 13. At the thread onset regions 13, the radial projection of the primary cutting edge 6 and of the two auxiliary cutting edges 7, 14 beyond the outer face 5 of the dowel body 2 decreases essentially to zero. The thread onset regions 13 are disposed on the same circumferential circle of the dowel body 2 at an angular spacing of approximately 120° from one another, as shown in FIG. 3.

The introduction portion 12 adjoining the part of the dowel body 2 that is provided with the helical primary and auxiliary cutting edges 6, 7, 14 tapers essentially conically toward the front end of the screwed dowel 1. The rearward end region 9 of the dowel body 2 widens approximately conically from the ending region of the primary cutting edge 6 to the rear end face 10. However, the radial projection does not exceed a maximum outside diameter d that is predetermined by the greatest possible radial projection of the cutting edges 6. The introduction portion 12 and the rearward end region 9 of the dowel body 2 have approximately equivalent lengths. These lengths are for instance approximately 8 mm to approximately 15 mm, or approximately ⅕ of the total length of the screwed dowel 1. The direction of rotation of the helically extending primary and auxiliary cutting edges 6, 7, 14 and of the female thread 4 is advantageously the same. Typically, a clockwise thread is involved. The female thread 4 can be a metric thread or a Whitworth thread. The dowel body 2 of the exemplary embodiment of the screwed dowel, shown as an example here, is of metal, such as a stainless steel. The cutting edges 6, 7, 14 are embodied integrally with the dowel body and can additionally be hardened, particularly in the region of the tip. As production methods for a screwed dowel of the invention made of metal, methods that can be considered are for instance metal-cutting methods, thread rolling methods, particularly for the auxiliary cutting edges, or extrusion methods. Plastic screwed dowels embodied according to the invention are preferably produced by an injection-molding process on a mass production scale.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Screw-in dowel, comprising:
 an essentially cylindrical dowel body, which has an axial bore;
 load engagement means, disposed in the axial bore;
 at least one cutting edge on an outer face, which extends helically along a majority of the outer face of the dowel body and protrudes radially past it, the cutting edge being a primary cutting edge, which over its length wraps around said dowel body in at least three windings;
 engagement means for transmitting a torque to the dowel body, the engagement means being disposed in an interior of the dowel body; and
 two auxiliary cutting edges that extend helically along the dowel body, each end of the auxiliary cutting edges extending from a thread onset, on a front region of the dowel body in terms of the setting direction, helically along the dowel body, protruding radially past the dowel body, and wrapping around it in at least 1.5 windings, wherein the primary cutting edge and the auxiliary cutting edges, on the front region of the dowel body in terms of the setting direction, each have thread onset regions, at which their radial protrusion past the outer face of the dowel body decreases essentially to zero, and that the thread onset regions are disposed at an angular spacing of approximately 120° from one another on a same circumferential circle of the dowel body.

2. The dowel of claim 1, wherein the engagement means are provided in a rearward end region of the dowel body.

3. The dowel of claim 2, wherein the engagement means has an essentially polygonal cross section.

4. The dowel of claim 3, wherein the engagement means has an essentially quadrilateral cross section.

5. The dowel of claim 3, wherein the engagement means has an essentially square cross section.

6. The dowel of claim 1, wherein the two auxiliary cutting edges have a lesser maximum radial projection past the outer face of the dowel body than the primary cutting edge.

7. The dowel of claim 1, wherein the two auxiliary cutting edges have pitches that differ from the pitch of the primary cutting edge.

8. The dowel of claim 1, wherein the primary cutting edge has one leading and one trailing edge in the selling direction, and the leading and the trailing edges of the primary culling edge form an angle with one another that is greater than 8°.

9. The dowel of claim 1, wherein on a front end of the dowel body, an introduction portion is provided, which has a smaller outside diameter than the dowel body in a region of the helical cutting edges.

10. The dowel of claim 9, wherein the introduction portion is embodied such that it tapers conically toward the front end.

11. The dowel of claim 1, wherein the bore in the dowel body is a blind bore.

12. The dowel of claim 1, wherein the load engagement means are embodied as female threads, and a pitch of the female threads is less than a pitch of the primary cutting edge on the outer face of the dowel body.

13. The dowel of claim 12, wherein the load engagement means are at least one of metric threads and Whitworth threads.

14. The dowel of claim 1, wherein the dowel body and the cutting edges comprise metal.

15. The dowel of claim 1, wherein the cutting edges are embodied integrally with the dowel body.

16. The dowel of claim 1, wherein the auxiliary cutting edges are rolled into the outer face of the dowel body.

17. The dowel of claim 1, wherein the primary cutting edge has one leading and one trailing edge in the setting direction, and the leading and the trailing edges of the primary cutting edge form an angle with one another that is greater than 10°.

18. The dowel of claim 1, wherein the dowel body and the cutting edges comprise stainless steel.

19. The dowel of claim 1, wherein said dowel is self-tapping.

20. The dowel of claim 1, said dowel suitable for use in a bore formed in a rigid substrate.

21. The dowel of claim 20, wherein said substrate is selected from one of concrete, stone, and brick masonry.

22. Screw-in dowel, comprising:
- an essentially cylindrical dowel body, which has an axial bore;
- load engagement means, disposed in the axial bore;
- at least one cutting edge on an outer face, which extends helically along a majority of the outer face of the dowel body and protrudes radially past it, the cutting edge being a primary cutting edge, which over its length wraps around said dowel body in at least three windings;
- engagement means for transmitting a torque to the dowel body, the engagement means being disposed in an interior of the dowel body; and
- two auxiliary cutting edges that extend helically along the dowel body, each end of the auxiliary cutting edges extending from a thread onset, on a front region of the dowel body in terms of the setting direction, helically along the dowel body, protruding radially past the dowel body, and wrapping around it in at least 1.5 windings, wherein the dowel body has a rearward end region which widens, toward a rear face end, to an outside diameter which does not exceed a maximum outside diameter, measured across the windings of the primary cutting edge.

* * * * *